United States Patent
Furukawa et al.

(10) Patent No.: US 9,146,896 B2
(45) Date of Patent: Sep. 29, 2015

(54) COMPUTER SYSTEM INCLUDING RECONFIGURABLE ARITHMETIC DEVICE WITH NETWORK OF PROCESSOR ELEMENTS

(75) Inventors: Hiroshi Furukawa, Yokohama (JP); Ichiro Kasama, Yokohama (JP)

(73) Assignee: Cypress Semiconductor Corporation, San Jose, CA (US)

( * ) Notice: Subject to any disclaimer, the term of this patent is extended or adjusted under 35 U.S.C. 154(b) by 1110 days.

(21) Appl. No.: 12/795,462

(22) Filed: Jun. 7, 2010

(65) Prior Publication Data

US 2010/0332795 A1 Dec. 30, 2010

(30) Foreign Application Priority Data

Jun. 25, 2009 (JP) .................................. 2009-151161

(51) Int. Cl.
  *G06F 15/78* (2006.01)
  *G06F 9/30* (2006.01)
  *G06F 9/38* (2006.01)

(52) U.S. Cl.
  CPC .......... *G06F 15/7867* (2013.01); *G06F 9/3001* (2013.01); *G06F 9/3879* (2013.01); *G06F 9/3897* (2013.01)

(58) Field of Classification Search
  CPC . G06F 15/7867; G06F 9/3001; G06F 9/3879; G06F 9/3897
  USPC .......................................................... 712/29
  See application file for complete search history.

(56) References Cited

U.S. PATENT DOCUMENTS

| | | | |
|---|---|---|---|
| 6,349,363 B2* | 2/2002 | Cai et al. ........................ | 711/129 |
| 6,457,116 B1* | 9/2002 | Mirsky et al. ................... | 712/16 |
| 2006/0010306 A1* | 1/2006 | Saito et al. ..................... | 712/226 |
| 2007/0074001 A1* | 3/2007 | Furukawa ....................... | 712/15 |
| 2007/0106879 A1 | 5/2007 | Tanaka | |
| 2010/0153676 A1 | 6/2010 | Kawamura | |
| 2010/0174884 A1 | 7/2010 | Morishita et al. | |

FOREIGN PATENT DOCUMENTS

JP 2006-302132 A 11/2006
JP 2007-94847 A 3/2007

(Continued)

OTHER PUBLICATIONS

English-Language Translation of Notice of Reasons for Rejection directed to related Japanese Patent Application No. 2009-151161, mailed Jul. 20, 2013; 4 pages.

*Primary Examiner* — Benjamin Geib

(57) ABSTRACT

A computer system that includes a central processing unit, a random-access-memory interface, a random-access memory whose addresses are allocated in an address space of the random-access-memory interface, and a reconfigurable arithmetic device is described herein. The reconfigurable arithmetic device includes input terminals, output terminals, a network of plurality of processor elements, a built-in random-access memory, a control unit, an inter-processor-element network and a configuration-data memory. In accordance with configuration on data from the configuration-data memory, the inter processor-element network is capable of changing the connection state of the input terminals and the output terminals to input ports and output ports of the plurality of processor elements, and the arithmetic function of the reconfigurable arithmetic device is capable of being dynamically changed.

16 Claims, 16 Drawing Sheets

(56) References Cited

FOREIGN PATENT DOCUMENTS

| JP | 2007-133456 A | 5/2007 |
|----|---------------|--------|
| WO | WO 2007/074583 A1 | 7/2007 |
| WO | WO 2008/142767 A1 | 11/2008 |

* cited by examiner

COMPUTER SYSTEM INCLUDING RECONFIGURABLE ARITHMETIC DEVICE WITH NETWORK OF PROCESSOR ELEMENTS

CROSS-REFERENCE TO RELATED APPLICATIONS

This application is based upon and claims the benefit of priority from the prior Japanese Patent Application No. 2009-151161 filed on Jun. 25, 2009, the entire contents of which are incorporated herein by reference.

FIELD

The present invention relates to a computer system including a reconfigurable arithmetic device and a reconfigurable arithmetic device.

BACKGROUND

Conventional programmable microprocessors of the related art sequentially read instructions stored in memories, and successively process the instructions. The instructions that are able to be performed are simple instructions. There is a certain limit to processing capability of such microprocessors.

In recent years, regarding microprocessors, in addition to existing demands including the demand for fast responses to interrupts and so forth, there has also been a demand for performance of more complicated arithmetic processes at a high speed.

Generally, control microcomputers are designed with the aim of realizing control using interrupts and fast responses to the interrupts, differently from general-purpose microprocessors (central processing units (CPUs)) that are designed with the aim of performing arithmetic processes at a high speed. For this reason, there is a problem that instructions which are able to be performed by the control microcomputers include only simple instructions and do not include complicated instructions. Furthermore, even when instructions which are able to be performed by the control microcomputers include complicated instructions, there is a problem that the times taken to perform the complicated instructions are long. Responses to interrupts are considered as an important feature of control micro processors that have been desired in recent years. However, in addition to the demand for responses to interrupts, there has been a demand for being able to perform an application including complicated arithmetic processes at a high speed. Microprocessors, including control microprocessors, have the following problems.

When performance of a complicated arithmetic process is made possible using such a microprocessor, lengthy latency for the arithmetic process occurs in an arithmetic logic unit (ALU) that is provided in the microprocessor. Accordingly, slow response times to an interrupt when the arithmetic process is performed are problematic. Furthermore, when an arithmetic process that is being performed is terminated because of the slow response, an increasing penalty is incurred by re-performing the arithmetic process. Accordingly, the time taken to perform the arithmetic process is problematically increased.

For this reason, a configuration has been used, in which a coprocessor that is dedicated to the performance of complicated arithmetic processes is connected to a processor. In this configuration, the coprocessor performs complicated arithmetic processes, and the processor receives only results of the arithmetic processes. The coprocessor is connected on a general-purpose bus. In such an arrangement, certain arithmetic processes that are included in an application may be continuously performed, such as when an arithmetic process uses a result of the immediately previous arithmetic process or when a result of an arithmetic process is necessary immediately after the arithmetic process is performed. In such a case, even when, for example, only one arithmetic process using a square root is performed by the coprocessor, there is a problem because the capability of performing arithmetic processes is not markedly improved in reality because of a penalty incurred by bus access. Furthermore, when a coprocessor is connected to a general-purpose bus, processing is negatively influenced by responses to interrupts and so forth, and the time taken to process interrupts is problematically increased.

Furthermore, when a coprocessor is connected to a processor using a dedicated interface (I/F), arithmetic processes that are able to be performed are determined based on instructions that are implemented in the connected coprocessor. Accordingly, there is a problem because arithmetic processes which are able to be used are limited.

Arithmetic devices capable of being reconfigured to solve the problem of a coprocessor's limited arithmetic function are known. An arithmetic device capable of being reconfigured includes a plurality of processor elements and an inter-processor-element network in which the plurality of processor elements are connected to input terminals and output terminals so that connection therebetween is able to be changed. The internal state of the arithmetic device capable of being reconfigured is able to be changed so that a plurality of arithmetic functions are selectively performed. Japanese Laid-open Patent Publications No. 2006-302132, No. 2007-094847, and No. 2007-133456 describe arithmetic devices whose internal state is able to be changed as described above and which are capable of being reconfigured. Hereinafter, arithmetic devices capable of being reconfigured are referred to as "reconfigurable arithmetic devices".

Generally, reconfigurable arithmetic devices aim to perform complicated arithmetic processes. Accordingly, the reconfigurable arithmetic devices are configured so that a large number of pieces of variable data are able to be set and an arithmetic process is able to be repeatedly performed. Thus, arithmetic processes that are performed in the reconfigurable arithmetic devices take long times, and it is not strictly necessary that the reconfigurable arithmetic devices be accessed by processors at a high speed. For this reason, typically, such a reconfigurable arithmetic device is connected to a general-purpose bus, and the reconfigurable arithmetic device is activated using an interrupt after a processor (CPU) sets variable data. When reconfigurable arithmetic devices are used, processors are referred to as "CPUs". Accordingly, hereinafter, description is made supposing that processors are CPUs.

The arithmetic function of reconfigurable arithmetic devices is able to be changed, and the reconfigurable arithmetic devices are capable of performing very complicated arithmetic processes. When the internal configuration of the reconfigurable arithmetic devices is changed, the reconfigurable arithmetic devices are capable of performing comparatively simple arithmetic processes. When such comparatively simple arithmetic processes are performed by CPUs, the time taken to perform the comparatively simple arithmetic processes is increased. Regarding use of the reconfigurable arithmetic devices in reality, the reconfigurable arithmetic devices are not often used to perform very complicated arithmetic processes. The reconfigurable arithmetic devices are often used to perform comparatively simple arithmetic processes.

The above-described reconfigurable arithmetic device is connected to a general-purpose bus. In reality, the ability to perform arithmetic processes is not markedly improved because of the above-described penalty incurred by bus access. There is also a problem due to the increased amount of time taken to process interrupts. For this reason, even when the comparatively simple arithmetic processes are performed by the reconfigurable arithmetic device, it is difficult to reduce the amount of time taken to perform the arithmetic processes.

SUMMARY

In accordance with aspects of the present invention, a computer system includes a central processing unit, a random-access-memory interface, a random-access memory in which addresses are allocated in an address space of the random-access-memory interface, and a reconfigurable arithmetic device whose arithmetic function is capable of being dynamically changed in accordance with configuration data. The reconfigurable arithmetic device may further include input terminals, output terminals, a plurality of processor elements that perform individual arithmetic processes in synchronization with a clock, an inter-processor-element network which connects the input terminals and the output terminals to input ports and output ports of the plurality of processor elements, and in which a connection state is able to be changed, a random-access memory built into the reconfigurable arithmetic device, in which addresses are allocated in the address space of the random-access-memory interface, into which the central processing unit writes data associated with an arithmetic process that is to be performed in the reconfigurable arithmetic device, and into which a result of the arithmetic process that is performed in the reconfigurable arithmetic device is written, and a control unit that, when the central processing unit writes data associated with the arithmetic process into the random-access memory built into the reconfigurable arithmetic device at a desired address, sets the plurality of processor elements and the inter-processor-element network to be in a state in which the plurality of processor elements and the inter-processor-element network are to perform the arithmetic processes, and that controls the plurality of processor elements and the inter-processor-element network to start the arithmetic processes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DETAILED DESCRIPTION

Figure 1:
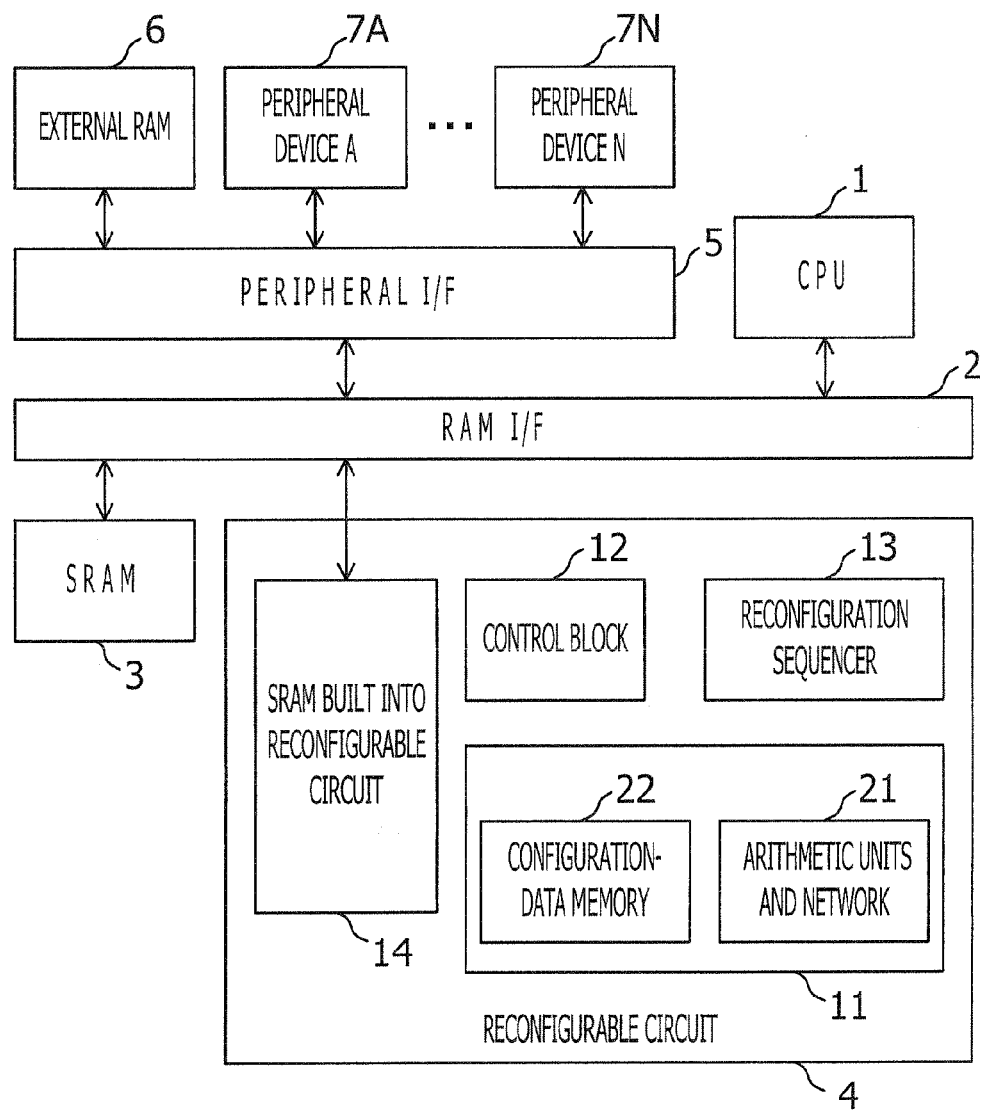
FIG. 1 is a diagram that schematically illustrates a configuration of a computer system according to a first exemplary implementation in accordance with aspects of the present invention.

FIG. 1 is a diagram of a configuration of a computer system according to a first exemplary implementation in accordance with aspects of the present invention.

As illustrated in FIG. 1, the computer system according to the first exemplary implementation includes a CPU 1, a random-access memory (RAM) I/F 2, an SRAM 3, a reconfigurable circuit 4, a peripheral I/F 5, an external RAM 6, and peripheral devices 7A to 7N. The CPU 1 accesses the SRAM 3 and the reconfigurable circuit 4 via the RAM I/F 2. Furthermore, the CPU 1 accesses the external RAM 6 and the peripheral devices 7A to 7N via the RAM I/F 2 and the peripheral I/F 5. Because access using the RAM I/F 2 is able to be performed at a speed that is higher than a speed at which access using the peripheral I/F 5 is performed, an access speed at which the CPU 1 accesses the SRAM 3 and the reconfigurable circuit 4 is higher than an access speed at which the CPU 1 accesses the external RAM 6 and the peripheral devices 7A to 7N.

All of or some of the CPU 1, the SRAM 3, the reconfigurable circuit 4, the RAM I/F 2, and the peripheral I/F 5 may be realized as a one-chip semiconductor integrated circuit. However, the CPU 1, the SRAM 3, the reconfigurable circuit 4, the RAM I/F 2, and the peripheral I/F 5 may be realized using a configuration in which the CPU 1, the SRAM 3, the reconfigurable circuit 4, and the peripheral I/F 5 are formed as an independent integrated circuit chip and in which the integrated circuit chip is implemented so that the integrated circuit chip is connected to wiring patterns of the RAM I/F 2 formed on a printed circuit board.

As illustrated in FIG. 1, the reconfigurable circuit 4 includes an arithmetic element 11, a control block 12, a reconfiguration sequencer 13, and an SRAM 14 that is built into the reconfigurable circuit. Furthermore, the arithmetic element 11 includes arithmetic units and a network 21 and a configuration-data memory 22. The CPU 1 accesses the SRAM 14 built into the reconfigurable circuit via the RAM I/F 2.

Figure 2:
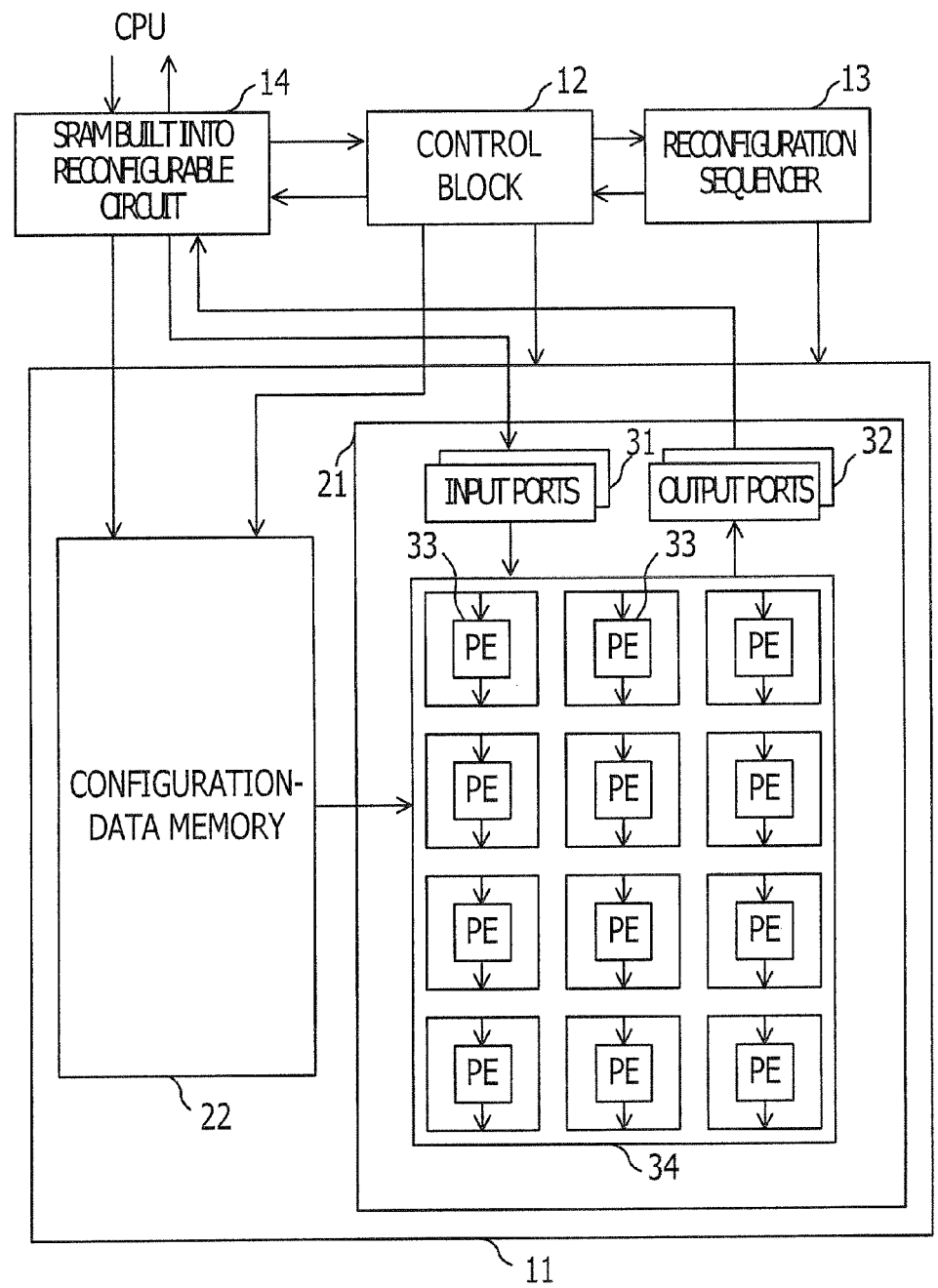
FIG. 2 is a diagram of a configuration of a reconfigurable circuit according to the first exemplary implementation.

FIG. 2 is a diagram illustrating a more detailed configuration of the reconfigurable circuit 4 in accordance with aspects of the present invention.

As illustrated in FIG. 2, the arithmetic units and network 21 include input ports 31, output ports 32, a plurality of Processing Elements (PEs) 33, and a network 34 in which connection between the input ports 31 and the output ports 32 and input units and output registers of the plurality of PEs 33 is able to be changed. The configuration-data memory 22 stores data, such as data concerning connection in the network 34 and data concerning connection in the PEs 33 that are to be used, for each arithmetic process to be performed. The configuration-data memory 22 outputs configuration data corresponding to an arithmetic process specified in a command to the arithmetic units and network 21. Variable data for the arithmetic process that is input from the input ports 31 is subjected to the arithmetic process specified in the command, and a result of the arithmetic process is output to the output ports 32.

When variable data for an arithmetic process and an arithmetic instruction are written into the SRAM 14 built into the reconfigurable circuit from the CPU 1, a reconfiguration activation command flag is set in the SRAM 14 built into the reconfigurable circuit. When the reconfiguration activation command flag is set, the control block 12 is notified of the fact that the reconfiguration activation command flag has been set. The control block 12 or the configuration-data memory 22 is notified of the arithmetic instruction, and the variable data for the arithmetic process is transferred to the input ports 31. A result of the arithmetic process that is output from the output ports 32 is written into the SRAM 14 built into the reconfigurable circuit. When the arithmetic process ends, the control block 12 writes an end flag into the SRAM 14 built into the reconfigurable circuit. The reconfiguration sequencer 13 performs sequence control on the arithmetic element 11 in accordance with a command issued by the control block 12. When an arithmetic sequence ends, the reconfiguration sequencer 13 notifies the control block 12 of the end of the arithmetic sequence.

Figure 3:
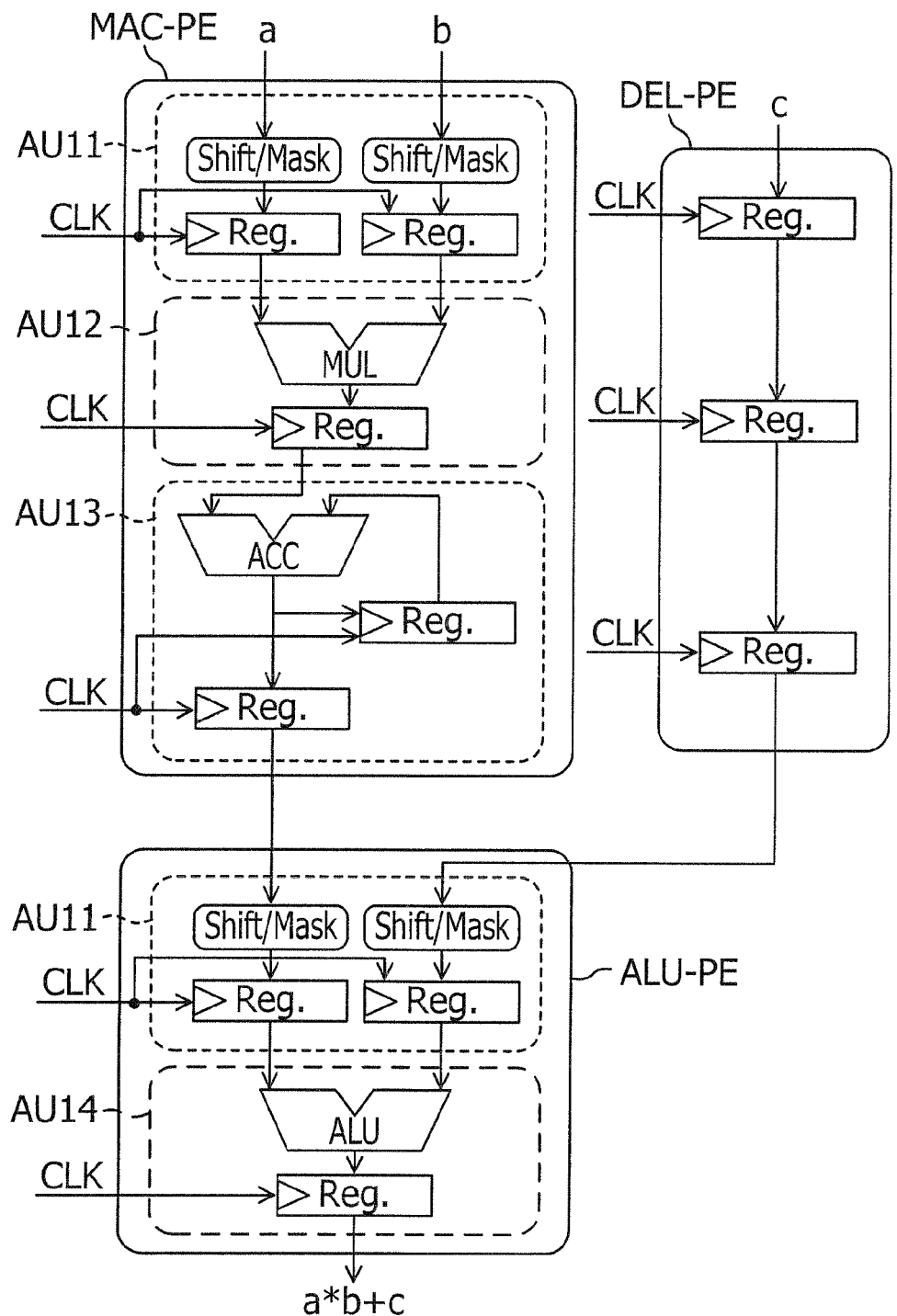
FIG. 3 is a diagram illustrating an example of a configuration for performing an arithmetic process in the reconfigurable circuit according to the first exemplary implementation.

FIG. 3 is a diagram for explaining an example of the arithmetic units and network 21 that perform a desired arithmetic process using a combination of the plurality of PEs 33. In the example illustrated in FIG. 3, a multiplier accumulate processor element MAC-PE, a delay processor element DEL-PE, and an addition processor element ALU-PE are connected to one another as illustrated in FIG. 3, and an arithmetic process of calculating an expression a×b+c is performed. Referring to FIG. 3, a Shift/Mask is an input unit including a shift circuit that shifts bits of input data and a mask circuit that masks some of the bits. A Reg. is a register that performs a hold operation in synchronization with a clock CLK. An MUL is a multiplier. An ACC is an adder. An ALU is an arithmetic unit whose arithmetic function is able to be switched so that one of addition, subtraction, and logic arithmetic is performed.

The arithmetic units and network 21 may include only PEs for a basic arithmetic process, each of the PEs including input units, an output register, and only one arithmetic unit. The PEs are able to be connected to one another using the network 34 so that the arithmetic units and network 21 perform a desired arithmetic process. Furthermore, a plurality of arithmetic units and registers may be provided in the PEs, and an arithmetic process whose frequency of use is high may be performed by one of the PEs.

Figure 4:
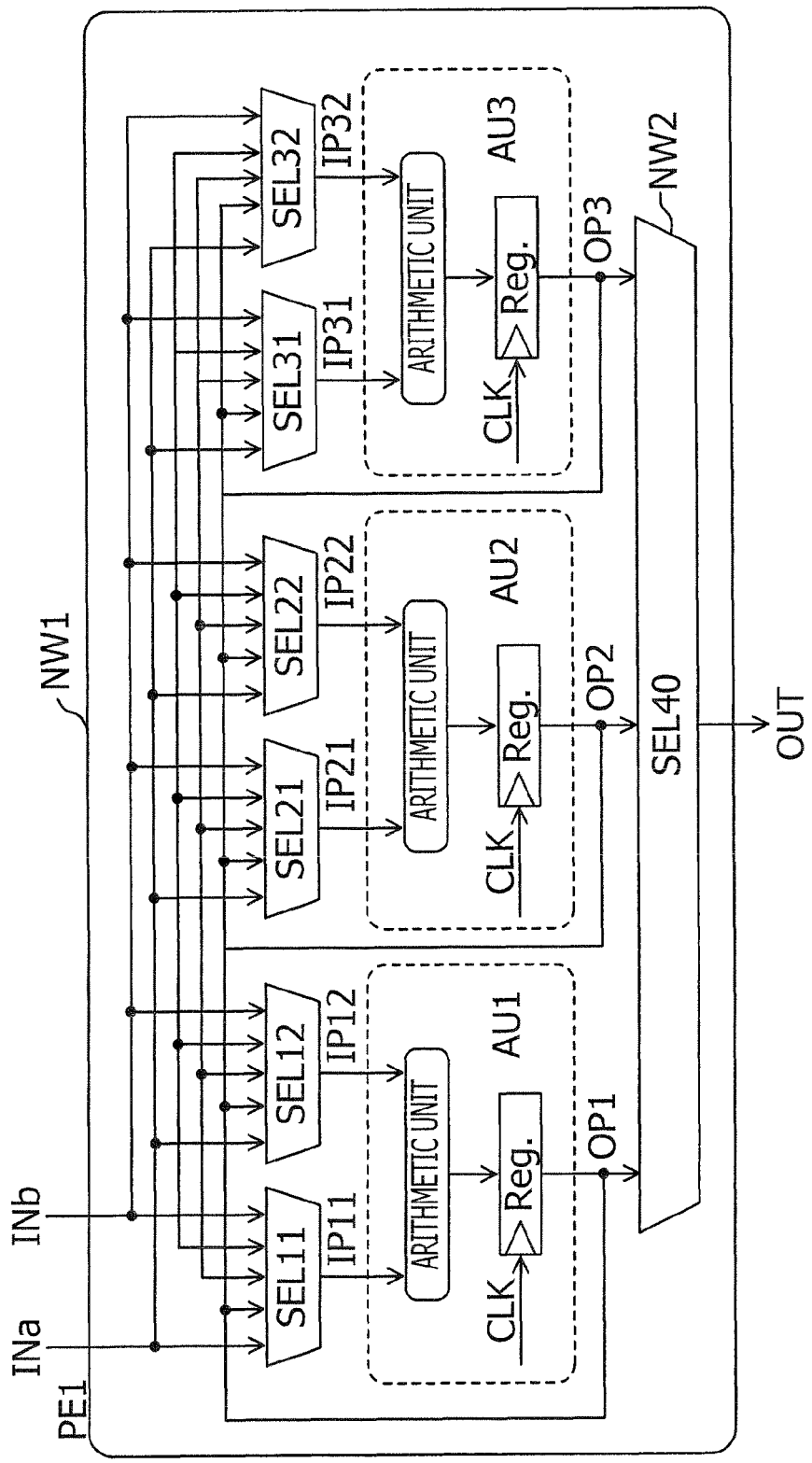
FIG. 4 is a diagram illustrating an example of a processor element (PE) that is provided in the reconfigurable circuit according to the first exemplary implementation and that has a plurality of arithmetic units and a network therein.

Furthermore, as illustrated in FIG. 4, a plurality of PEs and a network in which connection is able to be changed may be provided in one PE, and a complicated arithmetic process may be performed by the one PE.

The above-described arithmetic units and network 21 that have a large number of PEs such as the above-described PEs and that are also capable of repeatedly performing an arithmetic process may also perform a very complicated arithmetic process. However, a large amount of time is taken to perform a very complicated arithmetic process.

Because the reconfigurable circuit 4 has been broadly known, a more detailed description is omitted.

The reconfigurable circuit 4 according to the first exemplary implementation includes PEs that perform arithmetic processes which are frequently used, such as a divider, a square-root arithmetic unit, a trigonometric-function arithmetic unit, and a floating-point arithmetic unit. In other words, the reconfigurable circuit 4 includes a PE for a division arithmetic process, a PE for an arithmetic process using square root, a PE for an arithmetic process using a trigonometric function, a PE for a floating-point arithmetic process, and so forth. Here, such arithmetic processes are referred to as "specific arithmetic processes". The PEs 33 that perform the specific arithmetic processes are referred to as "specific arithmetic elements". Furthermore, instructions for issuing commands to perform the specific arithmetic processes with the reconfigurable circuit 4 are referred to herein as "second type of instructions". The specific arithmetic processes are determined in advance.

On the other hand, the plurality of PEs 33 are connected to one another using the network in the reconfigurable circuit 4, and arithmetic processes are performed. Such arithmetic processes are referred to as "accelerator arithmetic processes". Instruction for issuing commands to perform accelerator arithmetic processes with the reconfigurable circuit 4 are referred to as "first type of instructions".

Figure 5:
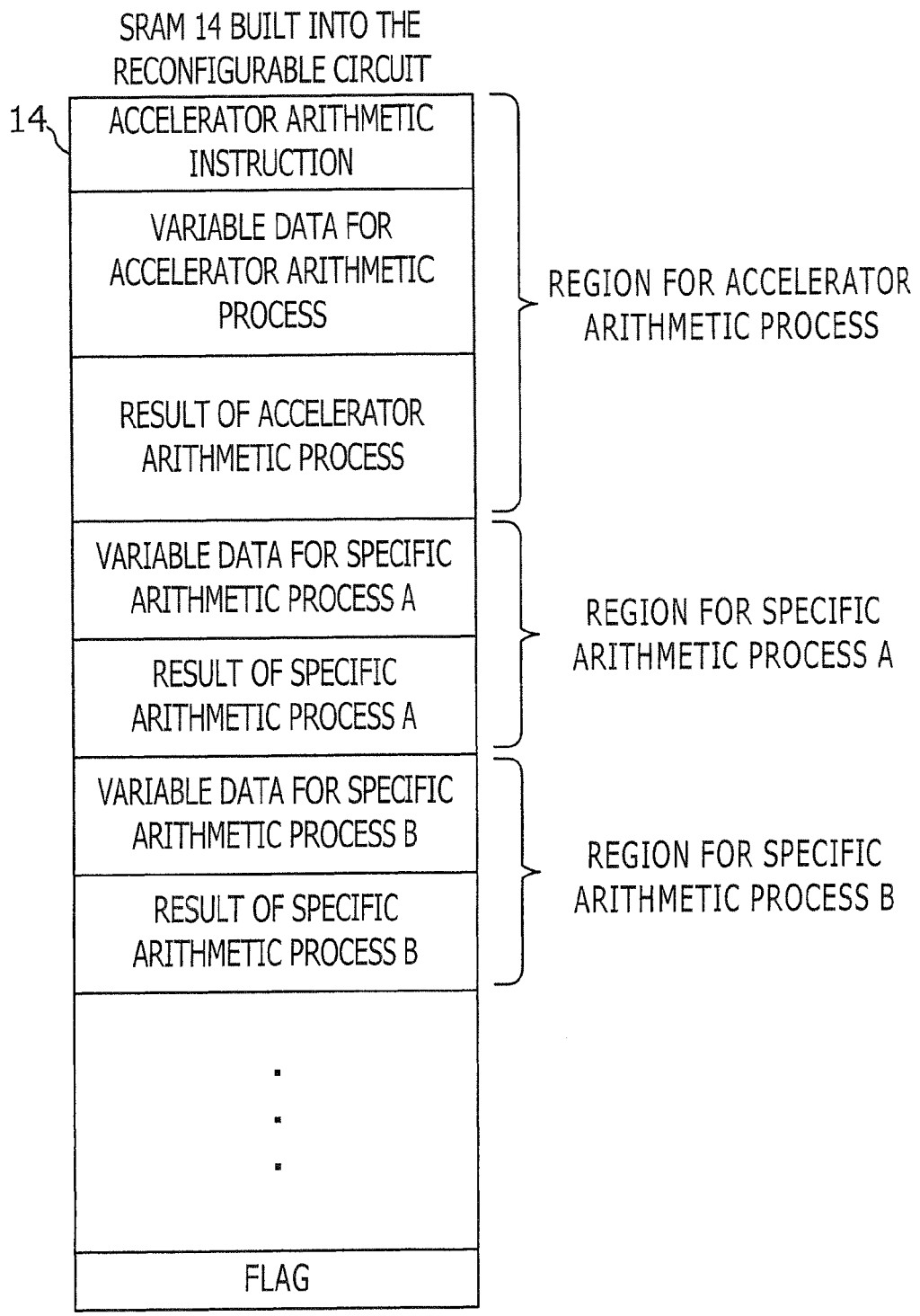
FIG. 5 is a diagram of an address configuration of a static random-access memory (SRAM) that is built into the reconfigurable circuit in the first exemplary implementation.

FIG. 5 is a diagram for explaining the assignment of an address region of the SRAM 14 built into the reconfigurable circuit in accordance with aspects of the present invention. As illustrated in FIG. 5, the address region of the SRAM 14 built into the reconfigurable circuit includes a region for an accelerator arithmetic process, a region for a specific arithmetic process A, a region for a specific arithmetic process B, and a flag region. The number of regions for the specific arithmetic processes that exist corresponds to the number of specific arithmetic processes that are registered.

The region for an accelerator arithmetic process includes an address region into which an accelerator arithmetic instruction (the first type of instruction), i.e., an instruction code, is to be written, an address region into which variable data for an accelerator arithmetic process is to be written, and an address region into which a result of an accelerator arithmetic process is to be written. The number of pieces of variable data and the number of results of an accelerator arithmetic process (the amount of data) differ depending on an accelerator arithmetic instruction. Thus, the address region into which variable data for an accelerator arithmetic process is to be written and the address region into which a result of an accelerator arithmetic process is to be written have regions into which the maximum amount of data is able to be written.

The region for the specific arithmetic process A includes an address region into which variable data for the specific arithmetic process A is to be written and an address region into which a result of the specific arithmetic process A is to be written. Similarly, the region for the specific arithmetic process B includes an address region into which variable data for the specific arithmetic process B is to be written and an address region into which a result of the specific arithmetic process B is to be written. Regions for the other specific arithmetic processes include address regions similar to the above-described address regions. The number of pieces of variable data and the number of results of each of the specific arithmetic processes (the amount of data) are determined in accordance with the type of specific arithmetic process. Accordingly, the width of each of the regions for the specific arithmetic processes is fixed.

As described above, when an accelerator arithmetic instruction is written into the region for an accelerator arithmetic process, the reconfiguration activation command flag is set. In response to the reconfiguration activation command flag that has been set, the control block 12 decodes the accelerator arithmetic instruction, and searches for corresponding configuration data that is stored in the configuration-data memory 22. The reconfiguration sequencer 13 sets the network 34 and the PEs 33 to be used, which are included in the arithmetic units and network 21, in accordance with the corresponding configuration data, which has been found, to be in a state in which the network 34 and the PEs 33 are to perform an accelerator arithmetic process specified in a command.

Variable data that is written into the region for an accelerator arithmetic process is input to the input ports 31 in accordance with a command issued by the reconfiguration sequencer 13. The variable data is supplied to the PEs 33, to which the variable data is to be input, via the network 34.

When the accelerator arithmetic process ends, a result of the accelerator arithmetic process is output to the output ports 32. The result of the accelerator arithmetic process is written into the address region, into which a result of an accelerator arithmetic process is to be written, of the SRAM 14 built into the reconfigurable circuit in accordance with a command issued by the reconfiguration sequencer 13.

As described above, in an accelerator arithmetic process, setting of the network 34 and the PEs 33 to be used, which are included in the arithmetic units and network 21, is controlled by the control block 12 and the reconfiguration sequencer 13.

Regarding each of the specific arithmetic processes, when variable data for the specific arithmetic process is written into a corresponding one of the address regions, whether or not the PEs 33 that are to perform the specific arithmetic process are able to be used is determined by the control block 12. When the PEs 33 that are to perform the specific arithmetic process are able to be used, the variable data is input to the corresponding PEs 33, and the corresponding PEs 33 are activated in a specific mode. The variable data may be transferred using the network 34, in this case. However, the input units of the PEs 33 that are to perform the specific arithmetic process may be directly connected to the address region, into which variable data for the specific arithmetic process is to be written, of the SRAM 14 built into the reconfigurable circuit, and the variable data may be directly input to the corresponding PEs 33. A result of the specific arithmetic process may be output in a manner similar to the above-described manner. Outputs from the corresponding PEs 33 may be directly supplied to the address region, into which a result of the specific arithmetic process is to be written, of the SRAM 14 built into the reconfigurable circuit.

Either way, with regard to the specific arithmetic processes, the PEs 33 that are to perform the specific arithmetic processes are determined in advance, and only paths for transferring variable data from the SRAM 14 built into the reconfigurable circuit to the corresponding PEs 33 and for outputting results of the specific arithmetic processes to the SRAM 14 built into the reconfigurable circuit are set. Thus, the specific arithmetic processes are able to be activated and performed in brief times.

Figure 6:
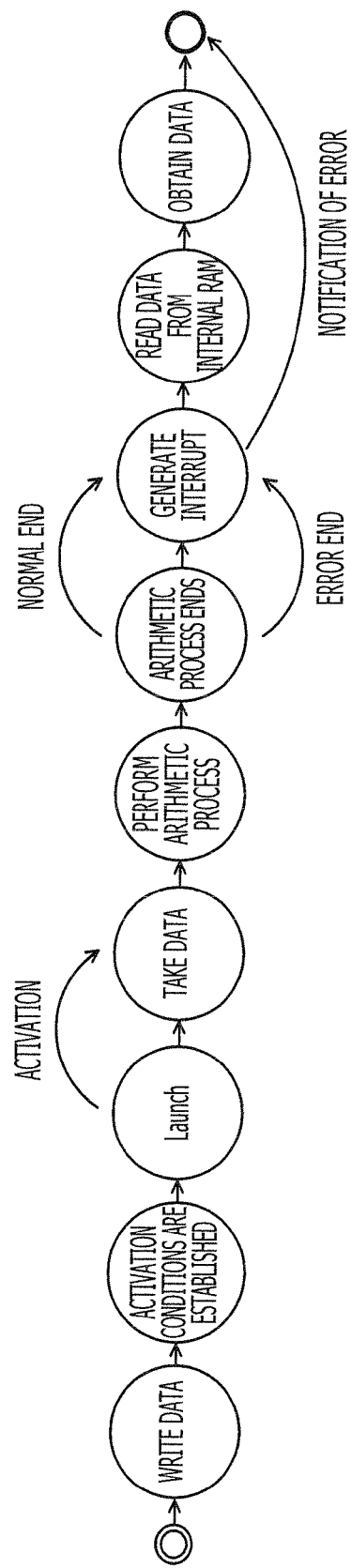
FIG. 6 is a sequence diagram of an operation of performing an arithmetic process utilizing the reconfigurable circuit according to the first exemplary implementation.

FIG. 6 is a sequence diagram illustrating a basic operation starting with the CPU 1 commanding the reconfigurable circuit 4 to perform an arithmetic process ending with the CPU 1 obtaining a result of the arithmetic process in the first exemplary implementation.

First, the CPU 1 writes variable data for an arithmetic process into the SRAM 14 built into the reconfigurable circuit at a desired address. As described above, when the arithmetic process is one of the specific arithmetic processes, a command to perform the arithmetic process is issued simply by writing variable data at a desired address. However, when the arithmetic process is an accelerator arithmetic process, issuing a command to perform the arithmetic process is further includes writing an accelerator arithmetic instruction.

Next, the control block 12 of the reconfigurable circuit 4 determines whether or not activation conditions have been established for starting the arithmetic process specified in the command. The control block 12 waits until the activation conditions are established. When the activation conditions are established, the control block 12 issues a command (a launch) to change the arithmetic units and network 21 so that the arithmetic units and network 21 are to perform the arithmetic process specified in the command. In accordance with the command, the reconfiguration sequencer 13 controls the arithmetic units and network 21 to take the variable data that has been input. After that, the arithmetic units and network 21 perform the arithmetic process under control of the reconfiguration sequencer 13.

When the arithmetic process has ended, the reconfiguration sequencer 13 determines whether or not the arithmetic process has ended normally. When the arithmetic process has ended normally, the reconfiguration sequencer 13 issues a command to output a result of the arithmetic process to the SRAM 14 built into the reconfigurable circuit at a desired address, and generates a normal-end interrupt. In response to the normal-end interrupt, the control block 12 writes a normal-end flag into the SRAM 14 built into the reconfigurable circuit. When the arithmetic process has not ended normally, the reconfiguration sequencer 13 generates an error-end interrupt. In response to the error-end interrupt, the control block 12 writes an error-end flag into the SRAM 14 built into the reconfigurable circuit. The above flags are realized using a combination of the end flag and a flag indicating a normal end or error end.

Figure 7:
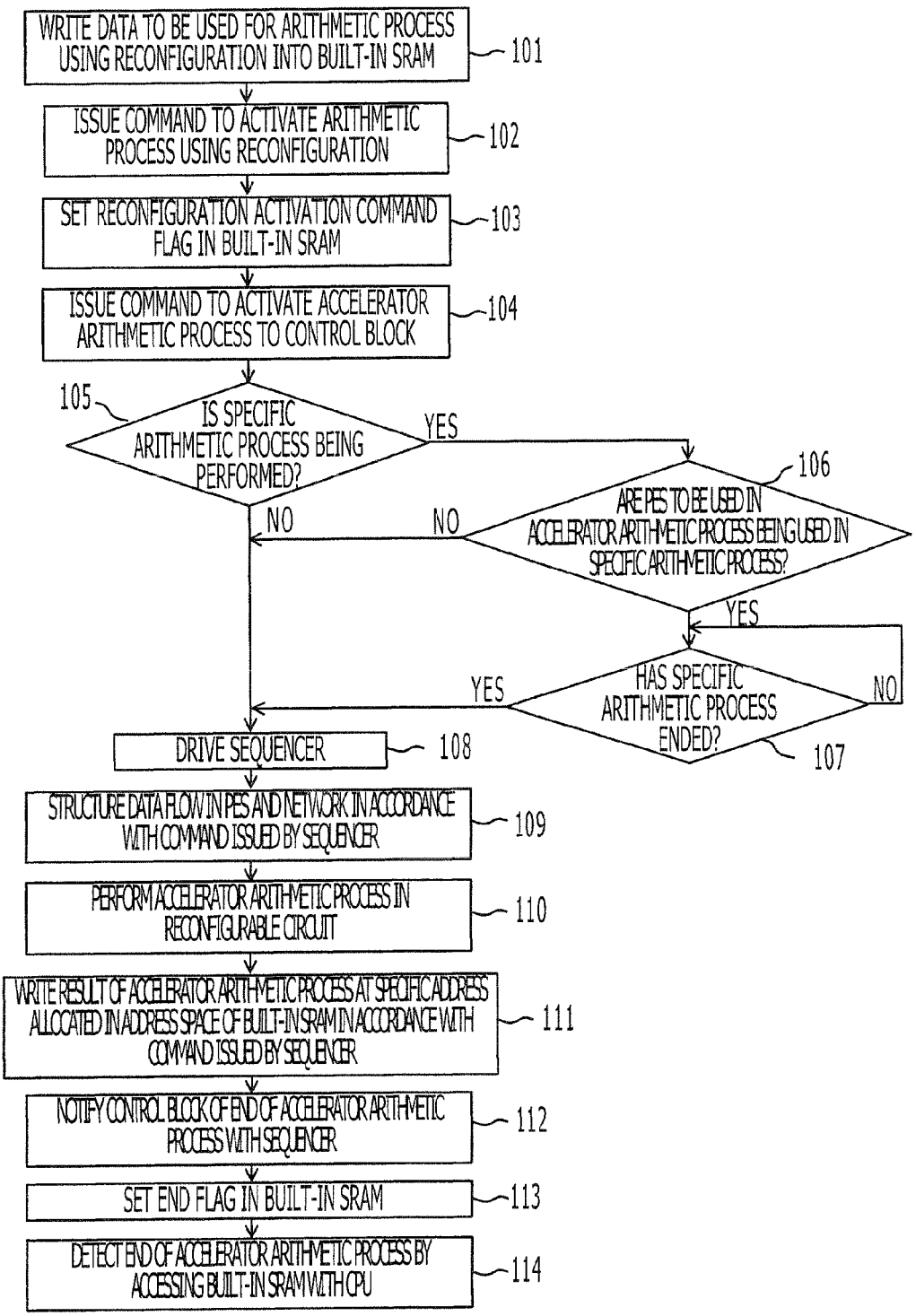
FIG. 7 is a flowchart of an operation that is performed when an accelerator arithmetic process is performed in the first exemplary implementation.

When the normal-end flag is set, the CPU 1 reads the result of the arithmetic process from the SRAM 14 built into the reconfigurable circuit, thereby obtaining the arithmetic data. When the error-end flag is set, the CPU 1 performs a process such as issuing a command to perform the arithmetic process again FIG. 7 is a flowchart of an operation starting with the CPU 1 commanding the reconfigurable circuit 4 to perform an accelerator arithmetic process ending with the CPU 1 obtaining a result of the accelerator arithmetic process in accordance with aspects of the present invention.

In step 101, the CPU 1 writes variable data for an accelerator arithmetic process into the SRAM 14 built into the reconfigurable circuit at a desired address (in the address region for variable data for an accelerator arithmetic process).

In step 102, the CPU 1 writes an accelerator arithmetic instruction into the SRAM 14 built into the reconfigurable circuit at a desired address (in the address region for an accelerator arithmetic instruction), thereby issuing a command to activate an arithmetic process using reconfiguration.

In step 103, the CPU 1 sets the reconfiguration activation command flag in the SRAM 14 built into the reconfigurable circuit.

In step 104, in response to the reconfiguration activation command flag that has been set in the SRAM 14 built into the reconfigurable circuit, a command to activate the accelerator arithmetic process is issued to the control block 12.

In step 105, the control block 12 determines whether or not one of the specific arithmetic processes is being performed by the arithmetic units and network 21. When none of the specific arithmetic processes is being performed, the control block 12 proceeds to step 108. When one of the specific arithmetic processes is being performed, the control block 12 proceeds to step 106.

In step 106, the control block 12 determines whether or not the PEs 33 that are being used in the specific arithmetic process, which is being performed, are to be used in the accelerator arithmetic process specified in the command. When the PEs 33 to be used in the accelerator arithmetic process specified in the command are not being used, the control block 12 proceeds to step 108. When the PEs 33 to be used in the accelerator arithmetic process specified in the command are being used, the control block 12 proceeds to step 107.

In step 107, the control block 12 determines whether or not the specific arithmetic process has ended, and waits until the specific arithmetic process ends. When the specific arithmetic process ends, the control block 12 proceeds to step 108. Note that, when a new command to perform another one of the specific arithmetic processes is issued while the control block 12 is waiting until the specific arithmetic process ends, a higher priority is assigned to performance of the specific arithmetic process specified in the new command. After the specific arithmetic process that is being performed ends, the specific arithmetic process specified in the new command is performed. Then, the control block 12 proceeds to step 107.

In step 108, the control block 12 issues a command to activate reconfiguration to the reconfiguration sequencer 13.

In step 109, the reconfiguration sequencer 13 reads configuration data corresponding to the accelerator arithmetic process specified in the command from the configuration-data memory 22. The reconfiguration sequencer 13 changes the PEs 33 and the network 34, which are provided in the arithmetic units and network 21, in accordance with the configuration data. Accordingly, a data flow with which the accelerator arithmetic process specified in the command is able to be performed is structured in the arithmetic units and network 21.

In step 110, the reconfiguration sequencer 13 transfers, to the input ports 31, the variable data that has been written into the SRAM 14 built into the reconfigurable circuit at the desired address (in the address region for variable data for an accelerator arithmetic process). The reconfiguration sequencer 13 controls performance of the accelerator arithmetic process in the reconfigurable circuit 4.

In step 111, when the accelerator arithmetic process ends, a result of the accelerator arithmetic process is output to the output ports 32, and the reconfiguration sequencer 13 controls writing of the result of the accelerator arithmetic process into the SRAM 14 built into the reconfigurable circuit at a desired address (in the address region for a result of an accelerator arithmetic process).

In step 112, the reconfiguration sequencer 13 notifies the control block 12 of the end of the accelerator arithmetic process.

In step 113, the control block 12 sets the end flag in the SRAM 14 built into the reconfigurable circuit.

In step 114, the CPU 1 detects the end of the accelerator arithmetic process using the end flag that has been set in the SRAM 14 built into the reconfigurable circuit, and ends the operation.

Figure 8:
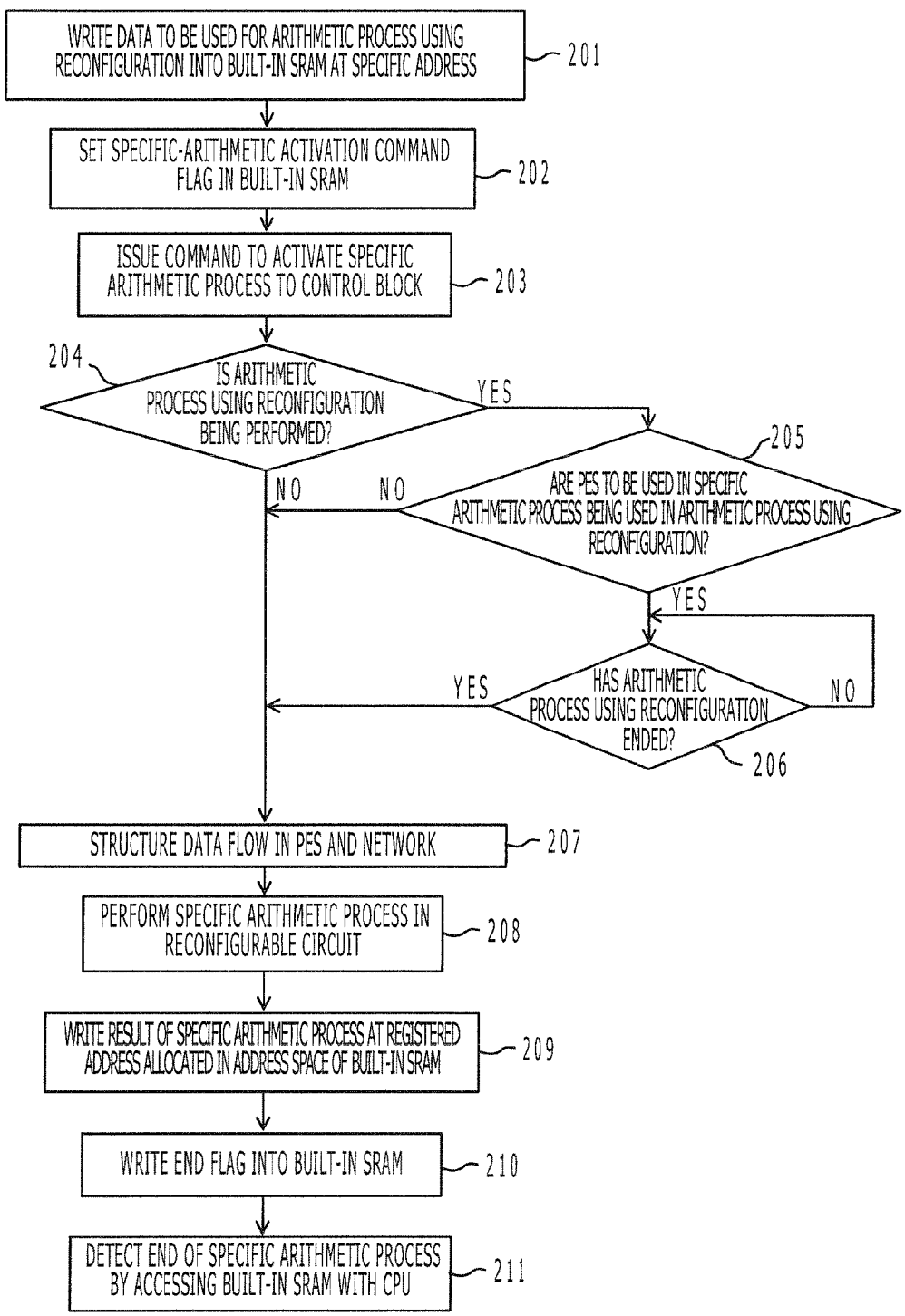
FIG. 8 is a flowchart of an operation that is performed when a specific arithmetic process is performed in the first exemplary implementation.

FIG. 8 is a flowchart of an operation stating with the CPU 1 commanding to the reconfigurable circuit 4 perform one of the specific arithmetic processes ending with the CPU 1 obtaining a result of the specific arithmetic process in accordance with aspects of the present invention.

In step 201, the CPU 1 writes variable data for one of the specific arithmetic processes into the SRAM 14 built into the reconfigurable circuit at a desired address (in the address region for variable data for the specific arithmetic process).

In step 202, the CPU 1 sets a specific-arithmetic activation command flag in the SRAM 14 built into the reconfigurable circuit.

In step 203, in response to writing of the variable data, a command to activate the specific arithmetic process is issued to the control block 12.

In step 204, the control block 12 determines whether or not an arithmetic process using reconfiguration is being performed by the arithmetic units and network 21, i.e., whether or not another one of the specific arithmetic processes or an accelerator arithmetic process is being performed. When an arithmetic process using reconfiguration is not being performed, the control block 12 proceeds to step 207. When an arithmetic process using reconfiguration is being performed, the control block 12 proceeds to step 205.

In step 205, the control block 12 determines whether or not the PEs 33 that are being used in the arithmetic process using reconfiguration which is being performed are to be used in the specific arithmetic process specified in the command. When the PEs 33 to be used in the specific arithmetic process specified in the command are being used, the control block 12 proceeds to step 207. When the PEs 33 to be used in the specific arithmetic process specified in the command are not being used, the control block 12 proceeds to step 206.

In step 206, the control block 12 determines whether or not the arithmetic process using reconfiguration has ended, and waits until the arithmetic process using reconfiguration ends. When the arithmetic process using reconfiguration ends, the control block 12 proceeds to step 207. Note that, in addition to the arithmetic process using reconfiguration that is being performed, even when a command to perform another accelerator arithmetic process has been previously issued, a higher priority is assigned to the specific arithmetic process.

In step 207, the control block 12 issues a command to structure a data flow for which the specific arithmetic process specified in the command is able to be performed to the arithmetic units and network 21. When the specific arithmetic process specified in the command is able to be performed by one of the PEs 33, the control block 12 sets the internal state of the PE 33. With the setting, the PE 33 enters a state in which the PE 33 is to perform the specific arithmetic process specified in the command, and is associated with desired addresses (in the address region for variable data for the specific arithmetic process and the address region for a result of the specific arithmetic process) of the SRAM 14 built into the reconfigurable circuit.

In step 208, the control block 12 transfers the variable data that has been written into the SRAM 14 built into the reconfigurable circuit at the address (in the address region for variable data for the specific arithmetic process) to the input units of the PEs 33 that are to perform the specific arithmetic process, and the specific arithmetic process is performed.

In step 209, when the specific arithmetic process ends, the control block 12 writes a result of the specific arithmetic process that is obtained by the PEs 33 into the SRAM 14 built into the reconfigurable circuit at the desired address (in the address region for a result of the specific arithmetic process).

In step 210, the control block 12 sets the end flag in the SRAM 14 built into the reconfigurable circuit in response to the end of the specific arithmetic process.

In step 211, the CPU 1 detects the end of the specific arithmetic process using the end flag that has been set in the SRAM 14 built into the reconfigurable circuit, and ends the operation.

Figure 9:
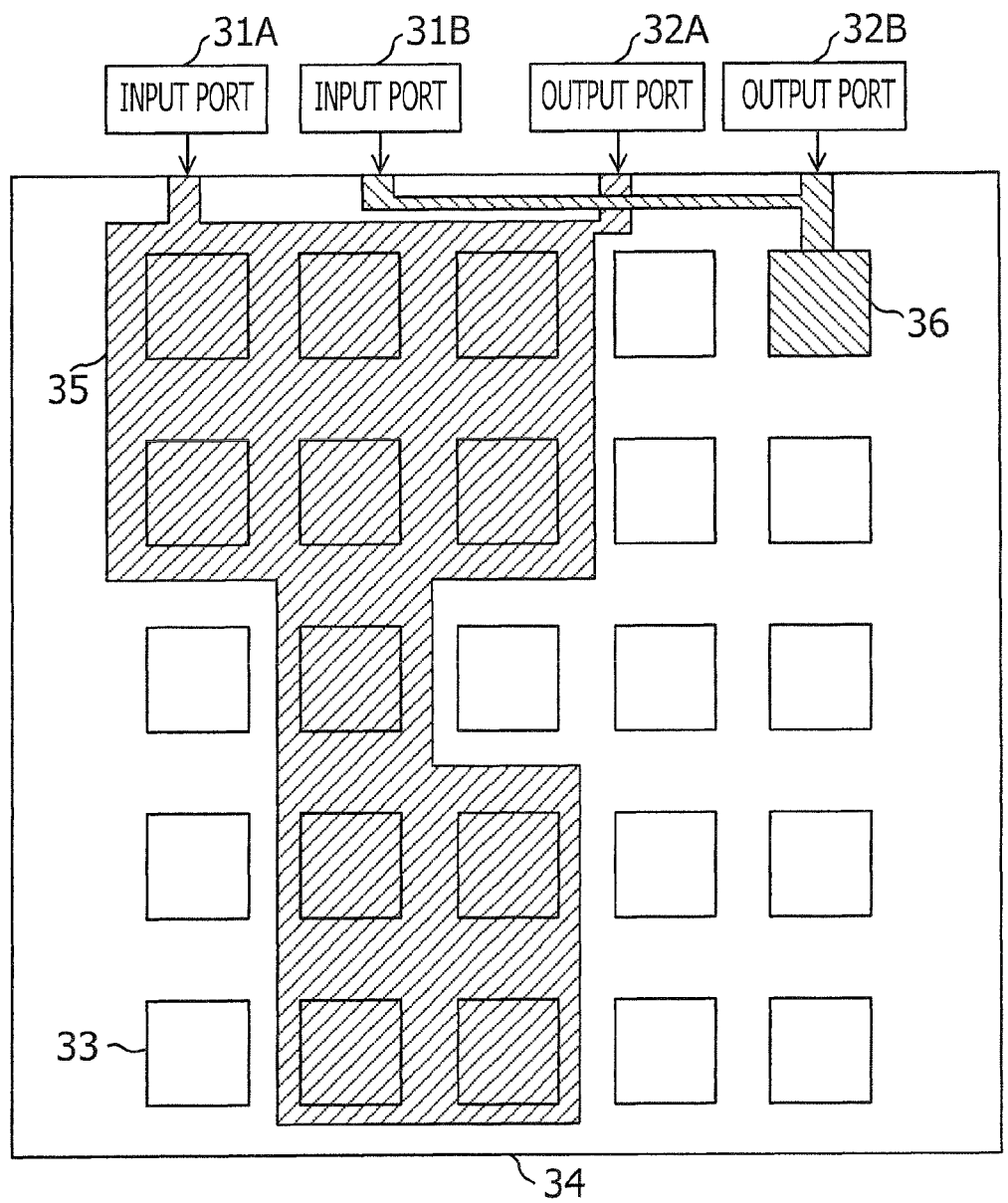
FIG. 9 is a diagram for explaining a state in which arithmetic units and network are used when an accelerator arithmetic process and a specific arithmetic process are performed in parallel with each other in the first exemplary implementation.

FIG. 9 is a diagram schematically illustrating a state in which one portion of the arithmetic units and network 21 is performing an accelerator arithmetic process and another portion is performing one of the specific arithmetic processes in accordance with aspects of the present invention.

The eleven PEs 33 and the network 34 are a portion of the PEs 33 and the network 34. The portion of the PEs 33 and the network 34 is indicated by a section 35 shaded with diagonal lines. This portion performs an accelerator arithmetic process which is specified in a command. The portion of the PEs 33 and the network 34 performs the accelerator arithmetic process specified in the command on variable data that is input from an input port 31A, and outputs a result of the accelerator arithmetic process to an output port 32A. The one PE 33 and the network 34 are a portion of the PEs 33 and the network 34. The portion of the PEs 33 and the network 34 is indicated by a section 36 shaded with diagonal lines, and a portion that performs one of the specific arithmetic processes which is specified in a command. The portion of the PEs 33 and the network 34 performs the specific arithmetic process specified in the command on variable data that is input from an input port 31B, and outputs a result of the specific arithmetic process to an output port 32B. The other portion of the PEs 33 and the network 34 other than the sections 35 and 36 shaded with diagonal lines is not used when the accelerator arithmetic process and the specific arithmetic process are being performed. If the PEs 33 included in the other portion of the PEs 33 and the network 34 are able to perform another one of the specific arithmetic processes, in addition, the specific arithmetic process may be performed.

Figure 10:
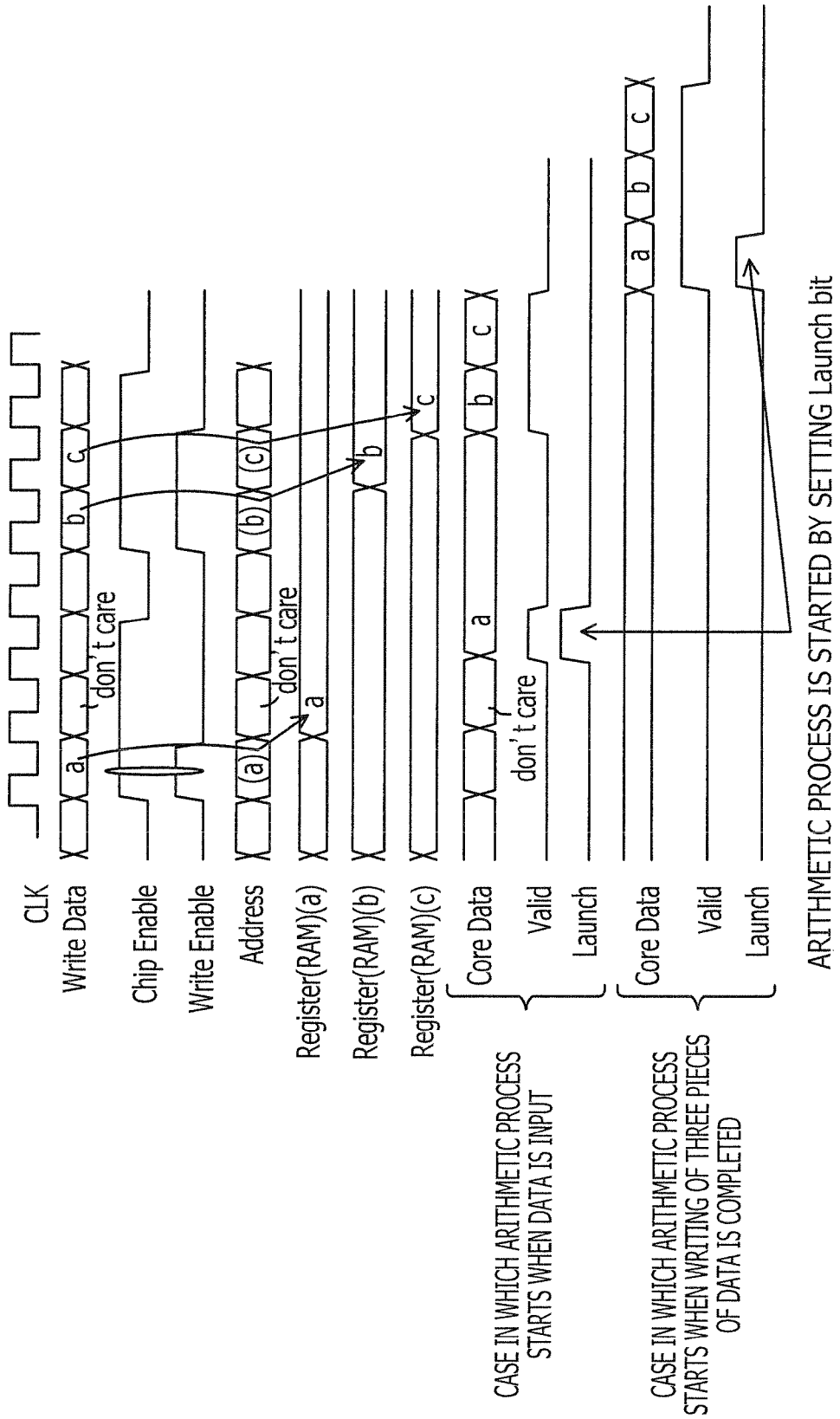
FIG. 10 is a timing diagram of an activation operation for a specific arithmetic process in the first exemplary implementation.

FIG. 10 is a timing diagram of an activation operation that is performed when one of the specific arithmetic processes is performed by the reconfigurable circuit 4 in accordance with aspects of the present invention. Regarding the activation operation that is performed when one of the specific arithmetic processes is performed, there are the following two cases. In a first case, when a first piece of variable data among a plurality of pieces of variable data is written into the SRAM 14 built into the reconfigurable circuit, a command (a launch) to immediately start the specific arithmetic process is generated. In a second case, when all of the pieces (in FIG. 10, three pieces) of variable data to be used for the specific arithmetic process are written, a launch is generated. In the first case, when another one of the pieces of variable data is written into the SRAM 14 built into the reconfigurable circuit after the launch has been generated, the piece of variable data is immediately transferred to the PEs 33. When all of the pieces of variable data are input to the PEs 33, the specific arithmetic process is practically performed.

Figure 11:
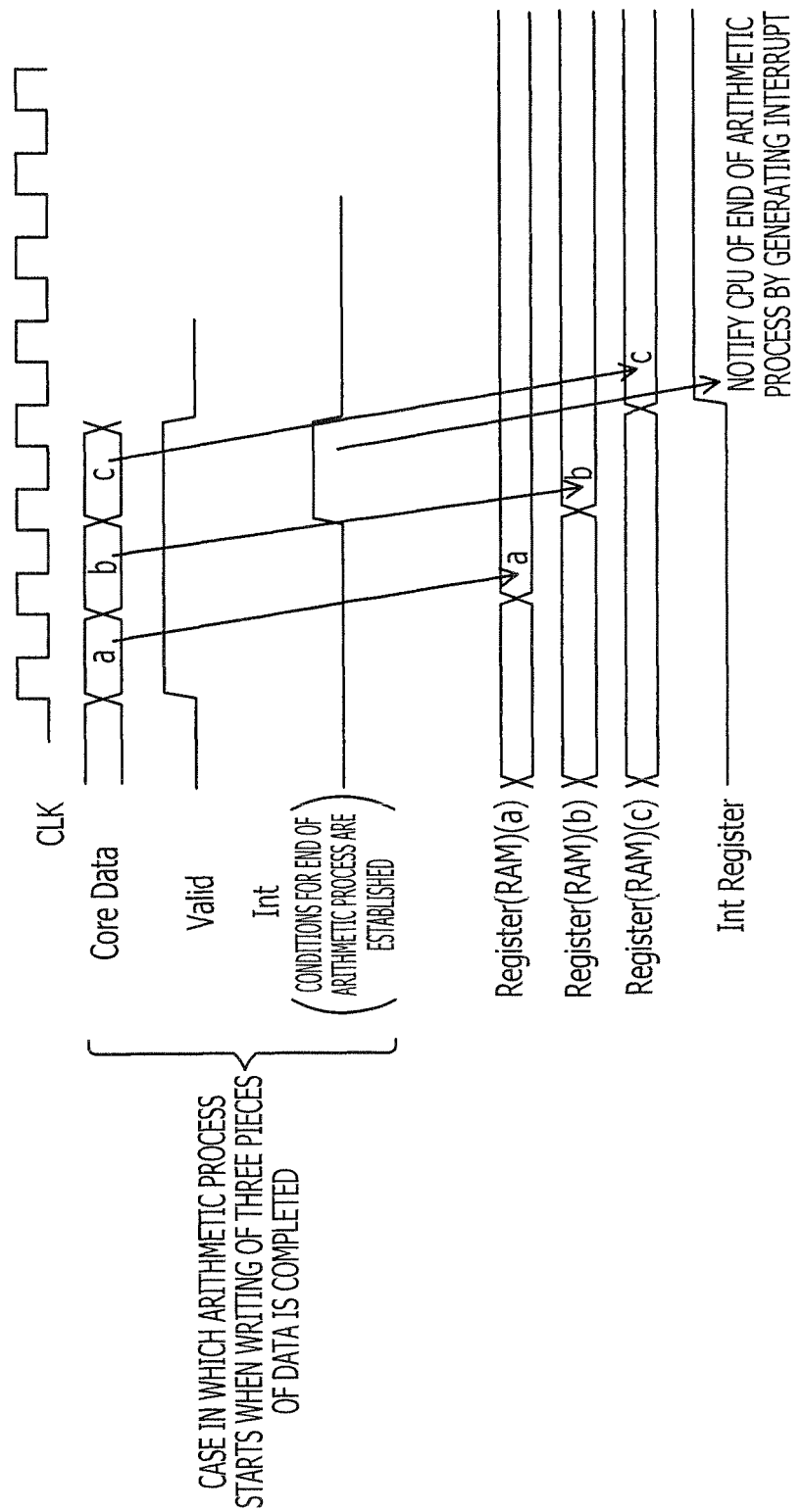
FIG. 11 is a timing diagram of an end operation for a specific arithmetic process in the first exemplary implementation.

FIG. 11 is a timing diagram of an end operation that is performed when one of the specific arithmetic processes is performed, in accordance with aspects of the present invention. Here, there are three pieces of output data a, b, and c. When the three pieces of output data a, b, and c are sequentially generated by performing the specific arithmetic process, the three pieces of output data a, b, and c are sequentially written into the SRAM 14 (registers) built into the reconfigurable circuit. When the third piece of output data c is generated, the conditions for the end of the specific arithmetic process are established. When the third piece of output data c is written into the SRAM 14 (a register) built into the reconfigurable circuit, an interrupt is generated for the CPU 1, thereby notifying the CPU 1 of the end of the specific arithmetic process.

Figure 12:
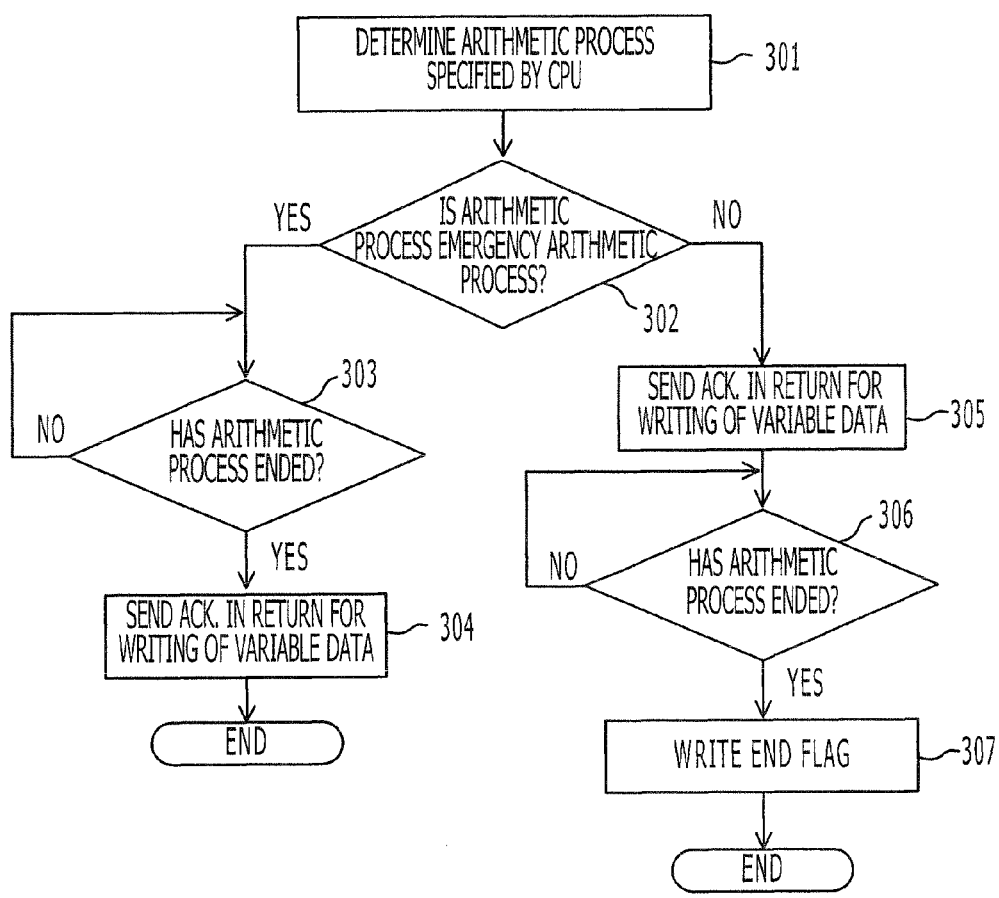
FIG. 12 is a flowchart of an operation in which, when a specific arithmetic process is performed in the first exemplary implementation, sending of an acknowledge in return for access from a CPU is delayed until a specific arithmetic process ends, the operation being a modification example in accordance with aspects of the present invention.

As illustrated in FIG. 8, in the first exemplary implementation, in order to command the reconfigurable circuit 4 to perform one of the specific arithmetic processes, the CPU 1 writes variable data into the SRAM 14 built into the reconfigurable circuit at a desired address (in the region for variable data for the specific arithmetic process, and sets the specific-arithmetic activation command flag. Then, when the end flag is set by the control block 12, the CPU 1 detects the end of the specific arithmetic process using the end flag. In this sequence, after the CPU 1 commands the reconfigurable circuit 4 to perform the specific arithmetic process, the CPU 1 is able to perform another arithmetic process until the end flag is set. However, the processing capability of the CPU 1 may directly influence latency, and, depending upon an application, there may be circumstances in which the CPU 1 desires to immediately use a result of an arithmetic process. FIG. 12 is a flowchart of a sequence that is suitable for such circumstances, in accordance with aspects of the present invention.

In step 301, the control block 12 detects an address at which variable data has been written into the SRAM 14 built into the reconfigurable circuit by the CPU 1, thereby determining a specific arithmetic process that has been specified by the CPU 1.

In step 302, the control block 12 determines whether or not the specific arithmetic process that has been specified is an emergency arithmetic process. When the specific arithmetic process is an emergency arithmetic process, the control block 12 proceeds to step 303. When the specific arithmetic process is not an emergency arithmetic process, the control block 12 proceeds to step 305. For example, all of the specific arithmetic processes may also be determined to be emergency arithmetic processes. Alternatively, only the simplest specific arithmetic process among the specific arithmetic processes may be determined to be an emergency arithmetic process.

In step 303, the control block 12 does not send an acknowledgement (ACK.) in return for writing of the variable data with the CPU 1, and waits until the specific arithmetic process ends. When the specific arithmetic process ends, the control block 12 proceeds to step 304.

In step 304, the control block 12 sends the acknowledgement (ACK.) in return for writing of the variable data. In response to the acknowledgement, the CPU 1 obtains a result of the specific arithmetic process by accessing a desired address (in the region for a result of the specific arithmetic process) of the SRAM 14 built into the reconfigurable circuit. As described above, the control block 12 does not send the acknowledgement in return for access from the CPU 1 until the specific arithmetic process ends. Thus, the capability of performing arithmetic processes that is assessed from the CPU 1 side is at its highest, and therefore, latency is at its shortest.

When the specific arithmetic process is not an emergency process, in step 305, the control block 12 sends the acknowledgement (ACK.) in return for writing of the variable data with the CPU 1. The control block 12 proceeds to step 306.

In step 306, the control block 12 waits until the specific arithmetic process ends. When the specific arithmetic process ends, the control block 12 proceeds to step 307.

In step 307, the control block 12 sets the end flag. The CPU 1 detects the end of the specific arithmetic process using the end flag. The CPU 1 obtains the result of the specific arithmetic process by accessing the desired address (in the region for a result of the specific arithmetic process) of the SRAM 14 built into the reconfigurable circuit at an appropriate time.

In the first exemplary implementation described above, the reconfigurable circuit is implemented using a configuration in which the reconfigurable circuit is able to be easily accessed from the CPU 1. Accordingly, various types of arithmetic processes from simple arithmetic processes to complicated arithmetic processes are able to be selectively performed while reducing the load imposed on the CPU 1. More particularly, regarding each of the simple specific arithmetic processes that are determined in advance, the specific arithmetic process is activated in a brief time in the reconfigurable circuit 4 simply by writing variable data with the CPU 1 at an address managed by the RAM I/F, and the CPU 1 is able to obtain a result of the specific arithmetic process in a brief time. Furthermore, as described with reference to FIG. 12, when the acknowledgement is not sent in return for access from the CPU 1 until the specific arithmetic process ends, the CPU 1 is able to obtain the result of the specific arithmetic process in the shortest time.

Moreover, when the CPU 1 issues a command to perform an accelerator arithmetic process and a command to perform one of the specific arithmetic processes, the accelerator arithmetic process and the specific arithmetic process are able to be performed in parallel with each other as long as no conflict associated with use of the PEs 33 occurs between the accelerator arithmetic process and the specific arithmetic process. Additionally, when a conflict occurs between the accelerator arithmetic process and the specific arithmetic process, the specific arithmetic process that is highly desired to be performed in a brief time is preferentially performed. Thus, a speed at which the CPU 1 performs arithmetic processes (latency) is substantially improved.

Advantages of the computer system including the reconfigurable circuit according to the first exemplary implementation are as follows.

First, various types of arithmetic processes are able to be performed while reducing the load imposed on the CPU. Accordingly, arithmetic processes are able to be performed at a high speed using a previous generation processor (microcomputer) whose processing capability is low.

Second, arithmetic processes are able to be performed at a high speed while good responses are maintained to interrupts that are considered as an important feature of a processor, in particular, a microcomputer.

Third, very complicated arithmetic processes are also able to be performed by the reconfigurable circuit. The type of arithmetic process is able to be changed, and various types of arithmetic processes are able to be handled with flexibility.

Fourth, the addresses in the SRAM built into the reconfigurable circuit are allocated in an address space of the RAM I/F. Accordingly, the SRAM built into the reconfigurable circuit is able to be accessed more easily than a coprocessor.

Thus, an environment is able to be easily structured, in which a development environment for the reconfigurable circuit is incorporated without substantially influencing a development environment for the CPU.

Finally, the CPU is able to issue a command to perform an arithmetic process simply by accessing the SRAM built into the reconfigurable circuit. Furthermore, an operation of accessing the reconfigurable circuit with the CPU is designed as a common operation. Accordingly, a load for an arithmetic process or a speed at an arithmetic process is performed is able to be easily changed simply by changing the reconfigurable circuit. For example, using a reconfigurable circuit that performs pipeline processing, an arithmetic process is able to be performed at a very high speed.

Figure 13:
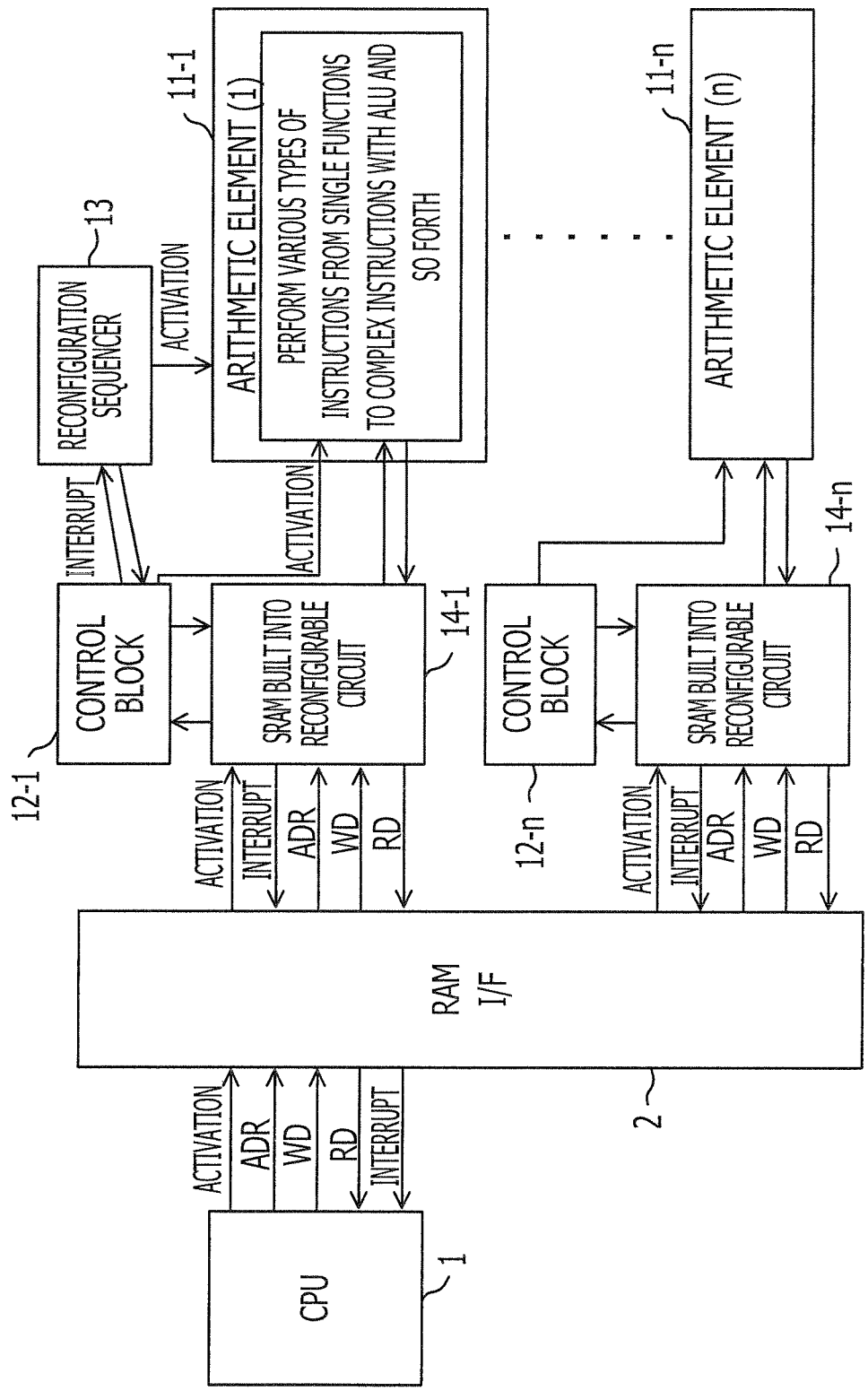
FIG. 13 is a diagram of a configuration of a computer system according to a second exemplary implementation in accordance with aspects of the present invention.

FIG. 13 is a diagram of a configuration of a computer system according to a second exemplary implementation in accordance with aspects of the present invention. In FIG. 13, only a portion of the computer system corresponding to the CPU 1, the RAM I/F 2, and a reconfigurable circuit 4 is illustrated. The reconfigurable circuit 4 includes a plurality of arithmetic elements 11-1, ..., and 11-n, a plurality of control blocks 12-1, ..., and 12-n, a plurality of SRAMs 14-1, ..., and 14-n built into the reconfigurable circuit, and the one reconfiguration sequencer 13. Each of the arithmetic elements, a corresponding one of the control blocks, a corresponding one of the SRAMs built into the reconfigurable circuit are grouped. In other words, the reconfigurable circuit 4 according to the second exemplary implementation includes a plurality of reconfigurable circuits according to the first exemplary implementation, and the reconfiguration sequencer 13 is shared.

In the second exemplary implementation, the CPU 1 is able to independently issue commands to perform arithmetic processes with the individual arithmetic elements via the shared RAM I/F 2 and the individual SRAMs built into the reconfigurable circuit. Accordingly, the CPU 1 is able to simultaneously perform a plurality of arithmetic processes using the plurality of arithmetic elements. Thus, a speed at which arithmetic processes are performed is able to be increased.

Figure 14:
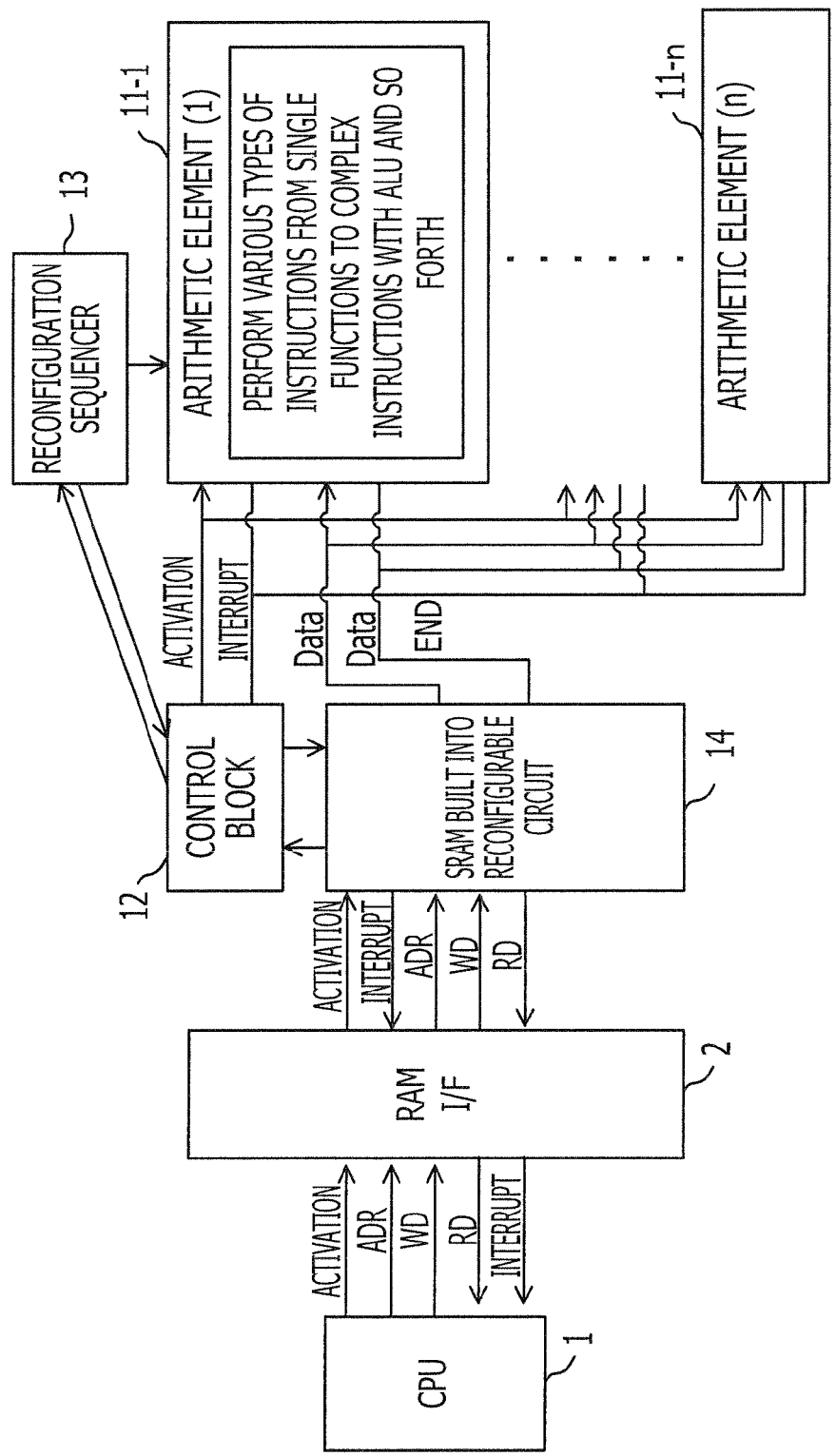
FIG. 14 is a diagram of a configuration of a computer system according to a third exemplary implementation in accordance with aspects of the present invention.

FIG. 14 is a diagram of a configuration of a computer system according to a third exemplary implementation in accordance with aspects of the present invention. In FIG. 14, only a portion of the computer system corresponding to the CPU 1, the RAM I/F 2, and a reconfigurable circuit 4 is illustrated. The reconfigurable circuit 4 includes a plurality of arithmetic elements 11-1, ..., and 11-n, the control block 12, the reconfiguration sequencer 13, and the SRAM 14 built into the reconfigurable circuit. In other words, the reconfigurable circuit 4 according to the third exemplary implementation includes a plurality of reconfigurable circuit according to the first exemplary implementation. The control block 12, the reconfiguration sequencer 13, and the SRAM 14 built into the reconfigurable circuit are shared.

Also in the third exemplary implementation, the CPU 1 is able to simultaneously perform a plurality of arithmetic processes using the plurality of arithmetic elements. The CPU 1 sequentially issues commands to perform a plurality of arithmetic processes via the shared RAM I/F 2 and the shared SRAM 14 built into the reconfigurable circuit. The shared control block 12 assigns the arithmetic processes that are specified in the commands to the individual arithmetic elements. Then, the shared reconfiguration sequencer 13 controls operations of performing the arithmetic processes with the individual arithmetic elements. Pieces of variable data and results of the arithmetic processes are sequentially controlled and transferred by the control block 12 and the reconfiguration sequencer 13. Accordingly, a speed at which arithmetic process are performed is lower than that in the second exemplary implementation. In the third exemplary implementation, no bus conflict occurs. The computer system according to the third exemplary implementation is suitable for a case in which pipeline processing is performed by the individual arithmetic elements, a case in which an arithmetic process that takes a comparatively long time to be performed is performed by one of the arithmetic elements, and so forth.

In the second and third exemplary implementations, various modification examples may be made with consideration of how to configure the individual arithmetic elements and what type of arithmetic process is to be performed by the individual arithmetic elements. For example, all of the arithmetic elements may be similarly configured. Arithmetic processes specified in commands may be appropriately assigned to the individual arithmetic elements in accordance with operation states of the individual arithmetic elements, and may be performed. However, each of the arithmetic elements may have a function and configuration, and the functions and configurations of the arithmetic elements may be different from one another.

Figure 15:
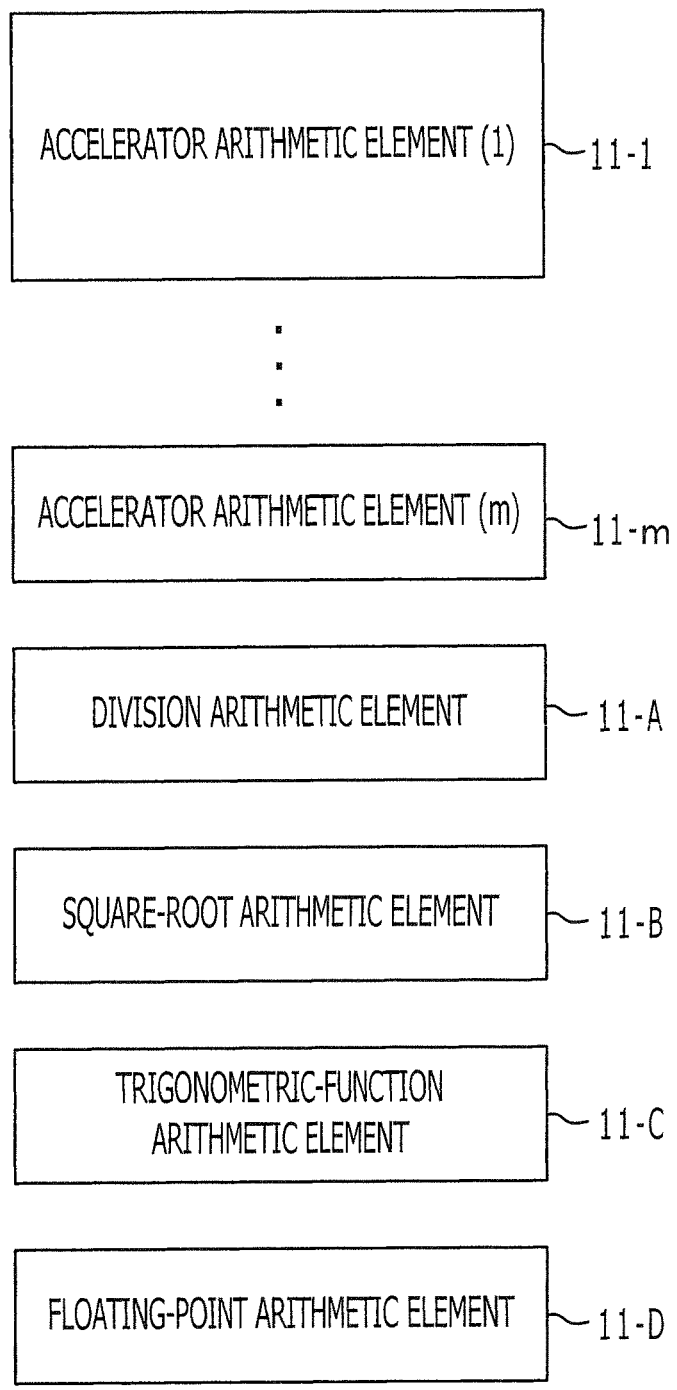
FIG. 15 is a diagram illustrating an example in which arithmetic functions are assigned to arithmetic elements in accordance with aspects of the present invention.

FIG. 15 illustrates an example in which each arithmetic element has a function and configuration, and in which the functions and configurations of the arithmetic elements are different from one another in accordance with aspects of the present invention. In FIG. 15, m accelerator arithmetic elements 11-1, . . . , and 11-m that are capable of performing accelerator arithmetic processes are provided. One division arithmetic element 11-A, one square-root arithmetic element 11-B, one trigonometric-function arithmetic element 11-C, and one floating-point arithmetic element 11-D are provided. In a case of performance of an accelerator arithmetic process, one of the accelerator arithmetic elements 11-1, . . . , and 11-m is selected, and the selected accelerator arithmetic element performs the accelerator arithmetic process. In a case of performance of a division arithmetic process, the division arithmetic element 11-A performs the division arithmetic process. In a case of performance of an arithmetic process using square root, the square-root arithmetic element 11-B performs the arithmetic process using square root. In a case of performance of an arithmetic process using a trigonometric function, the trigonometric-function arithmetic element 11-C performs the arithmetic process using a trigonometric function. In a case of performance of a floating-point arithmetic process, the floating-point arithmetic element 11-D performs the floating-point arithmetic process. Note that, because examples of an arithmetic process using a trigonometric function include various types of arithmetic processes, such as an arithmetic process using the sine function, an arithmetic process using the cosine function, and an arithmetic process using the tangent function. Accordingly, the configuration of the trigonometric-function arithmetic element 11-C may be changed in accordance with an arithmetic process using a trigonometric function to be performed. Another specific arithmetic process may be registered, and may be performed utilizing PEs included in the accelerator arithmetic elements 11-1, . . . , and 11-m.

Figure 16:
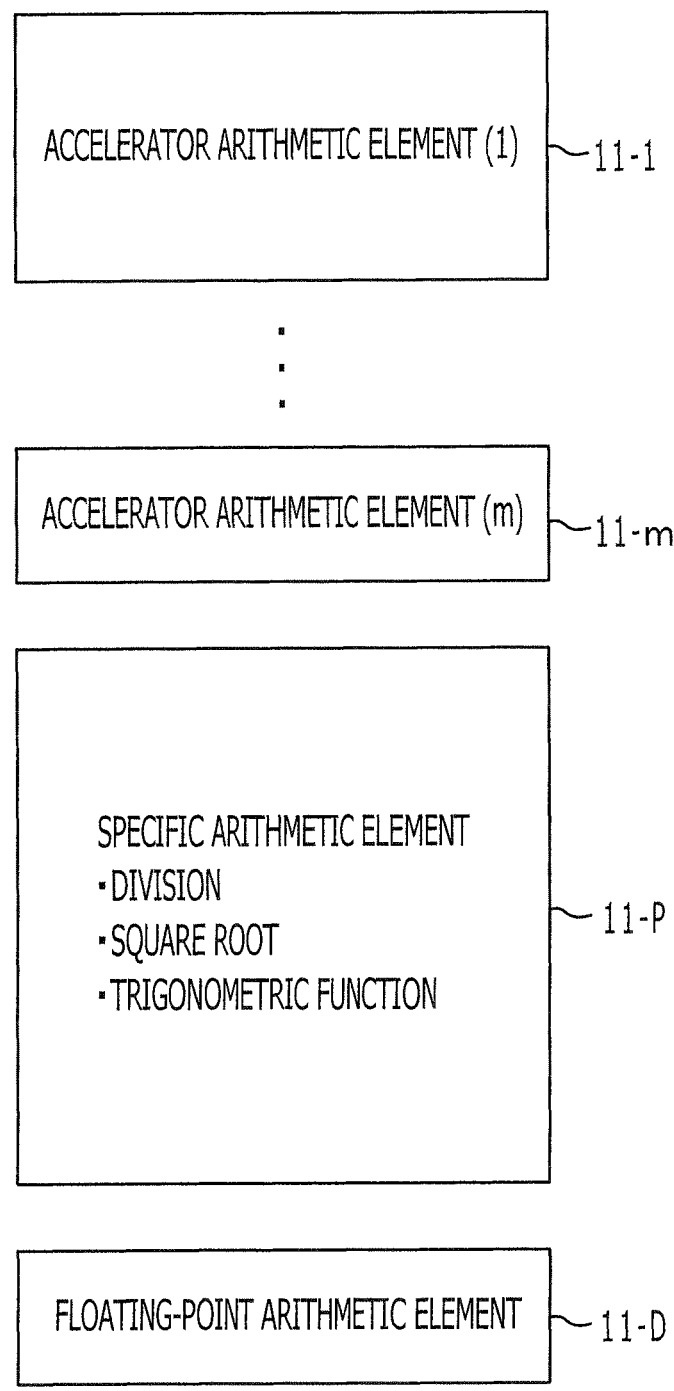
FIG. 16 is a diagram illustrating another example in which arithmetic functions are assigned to arithmetic elements in accordance with aspects of the present invention.

FIG. 16 illustrates another example in which each arithmetic element has a function and configuration, and in which the functions and configurations of the arithmetic elements are different from one another in accordance with aspects of the present invention. In FIG. 16, the m accelerator arithmetic elements 11-1, . . . , and 11-m that are capable of performing accelerator arithmetic processes are provided. One specific arithmetic element 11-P and the one floating-point arithmetic element 11-D are provided. The specific arithmetic element 11-P is capable of performing one of a division arithmetic process, an arithmetic process using square root, and an arithmetic process using a trigonometric function by changing arithmetic units and a network.

The type of arithmetic process is determined as a specific arithmetic process and the type of arithmetic element that is to be used to perform the specific arithmetic process may be determined with consideration of the frequency of use of the specific arithmetic process, a desired time to be taken to perform the specific arithmetic process, complexity of the configuration of the PEs, and so forth.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the illustrations in accordance with aspects of the present invention have been described in detail, it should be understood that the various changes, substitutions, and alterations could be made hereto without departing from the spirit and scope of the invention.

What is claimed is:
1. A reconfigurable arithmetic device, comprising:
a plurality of processor elements configured to perform first arithmetic processes corresponding to a first type of instruction and second arithmetic processes corresponding to a second type of instruction;
an inter-processor-element network configured to change a connection state of the processor elements;
a random-access memory (RAM); and
a control unit,
wherein the first type of instruction is written into the RAM at a first address, data for the first type of instruction is written into the RAM at a second address, and data for the second type of instruction is written into the RAM at a fixed input address other than the first and second addresses,
wherein when the first type of instruction is written at the first address, the control unit decodes the first type of instruction and sets the processor elements to a state to perform the first arithmetic processes, and
wherein, when data for the second type of instruction is written at the fixed input address, the control unit sets the processor elements to a state to perform the second arithmetic processes.
2. The reconfigurable arithmetic device of claim 1, wherein the second type of instruction includes a plurality of specific arithmetic instructions,
the fixed input address includes a plurality of specific fixed input addresses corresponding to the specific arithmetic instructions, and
the specific arithmetic instructions are written into the RAM at the corresponding specific fixed input addresses.
3. The reconfigurable arithmetic device of claim 2, wherein the processor elements include a processor element configured to perform arithmetic processes corresponding to the specific arithmetic instructions on a stand-alone basis.
4. The reconfigurable arithmetic device of claim 2, wherein the processor elements include a processor element capable of being changed to perform, on a stand-alonex basis, arithmetic processes which correspond to the specific arithmetic instructions and which are different from one another.

5. The reconfigurable arithmetic device of claim 1, wherein
when the first arithmetic processes are not being performed, the control unit performs the second arithmetic processes,
when the first arithmetic processes are being performed and the control unit has determined that the second arithmetic processes are able to be performed in parallel, the control unit sets the plurality of processor elements to a state to perform the second arithmetic processes in parallel with the first arithmetic processes, and
when the first arithmetic processes are being performed and the control unit has determined that the second arithmetic processes are not able to be performed in parallel, the control unit performs the second arithmetic processes after the first arithmetic processes end.

6. The reconfigurable arithmetic device of claim 1, wherein
a result of the first arithmetic processes are written into the RAM at a third address, and
a result of the second arithmetic processes are written into the RAM at a fixed output address.

7. The reconfigurable arithmetic device of claim 6, wherein, after the result of the second arithmetic processes are written into the RAM at the fixed output address, an acknowledgement of reception corresponding to writing of the data for the second type of instruction at the fixed input address is outputted.

8. The reconfigurable arithmetic device of claim 1, wherein addresses of the RAM are allocated in an address space of a random-access-memory interface.

9. A computer system, comprising:
a reconfigurable arithmetic device including:
a plurality of processor elements configured to perform first arithmetic processes corresponding to a first type of instruction and second arithmetic processes corresponding to a second type of instruction,
an inter-processor-element network configured to change a connection state of the processor elements,
a random-access memory (RAM), and
a control unit; and
a central processing unit (CPU) configured to write, into the RAM, the first type of instruction at a first address, data for the first type of instruction at a second address, and data for the second type of instruction at a fixed input address other than the first and second addresses, wherein
when the CPU writes the first type of instruction at the first address, the control unit decodes the first type of instruction and sets the processor elements to a state to perform the first arithmetic processes, and
when the CPU writes the data for the second type of instruction at the fixed input address, the control unit sets the processor elements to a state to perform the second arithmetic processes.

10. The computer system of claim 9, wherein
the second type of instruction includes a plurality of specific arithmetic instructions,
the fixed input address includes a plurality of specific fixed input addresses corresponding to the specific arithmetic instructions, and
the CPU writes the specific arithmetic instructions into the RAM at the corresponding specific fixed input addresses.

11. The computer system of claim 10, wherein the processor elements include a processor element capable of performing arithmetic processes corresponding to the specific arithmetic instructions on a stand-alone basis.

12. The computer system of claim 10, wherein the processor elements include a processor element capable of being changed to perform, on a stand-alone basis, arithmetic processes which correspond to the specific arithmetic instructions and which are different from one another.

13. The computer system of claim 9, wherein
when the first arithmetic processes are not being performed, the control unit performs the second arithmetic processes,
when the first arithmetic processes are being performed and the control unit has determined that the second arithmetic processes are able to be performed in parallel, the control unit sets the plurality of processor elements to a state to perform the second arithmetic processes in parallel with the first arithmetic processes, and
when the first arithmetic processes are being performed and the control unit has determined that the second arithmetic processes are not able to be performed in parallel, the control unit performs the second arithmetic processes after the first arithmetic processes end.

14. The computer system of claim 9, wherein
the reconfigurable arithmetic device writes a result of the first arithmetic processes into the RAM at a third address, and
the reconfigurable arithmetic device writes a result of the second arithmetic processes into the RAM at a fixed output address.

15. The computer system of claim 14, wherein the reconfigurable arithmetic device outputs an acknowledgement of reception corresponding to writing of the data for the second type of instruction at the fixed input address to the CPU, after the reconfigurable arithmetic device writes the result of the second arithmetic processes RAM at the fixed output address.

16. The computer system of claim 9, wherein addresses of the RAM are allocated in an address space of a random-access-memory interface.

* * * * *